(12) United States Patent
Yoon et al.

(10) Patent No.: US 8,758,942 B2
(45) Date of Patent: Jun. 24, 2014

(54) CATHODE ACTIVE MATERIAL, AND CATHODE AND LITHIUM INCLUDING THE SAME

(75) Inventors: Jaegu Yoon, Suwon-si (KR); Kyusung Park, Suwon-si (KR); Dongmin Im, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 898 days.

(21) Appl. No.: 12/273,847

(22) Filed: Nov. 19, 2008

(65) Prior Publication Data

US 2009/0220859 A1 Sep. 3, 2009

(51) Int. Cl.
*H01M 4/13* (2010.01)
*H01M 4/131* (2010.01)
*H01M 10/0525* (2010.01)
*H01M 4/505* (2010.01)
*H01M 4/485* (2010.01)
*H01M 4/525* (2010.01)

(52) U.S. Cl.
CPC .......... *H01M 4/131* (2013.01); *H01M 10/0525* (2013.01); *H01M 4/505* (2013.01); *H01M 4/485* (2013.01); *H01M 4/525* (2013.01); *Y02E 60/122* (2013.01)
USPC .................. 429/231.5; 429/231.2; 429/231.3; 429/231.6; 429/231.95

(58) Field of Classification Search
CPC . H01M 10/0525; H01M 4/131; H01M 4/485; H01M 4/505; H01M 4/525; Y02E 60/122
USPC ........ 429/231.9, 231.95, 231.2, 231.3, 231.5, 429/231.6
See application file for complete search history.

(56) References Cited

U.S. PATENT DOCUMENTS

| 6,677,082 | B2 | 1/2004 | Thackeray et al. | |
|---|---|---|---|---|
| 6,680,143 | B2 | 1/2004 | Thackeray et al. | |
| 2003/0068555 | A1* | 4/2003 | Naruoka | 429/231.4 |
| 2003/0129495 | A1* | 7/2003 | Yamato et al. | 429/231.1 |
| 2003/0211396 | A1* | 11/2003 | Kobayashi et al. | 429/231.95 |
| 2004/0081888 | A1* | 4/2004 | Thakeray et al. | 429/231.1 |
| 2007/0065723 | A1 | 3/2007 | Takeda et al. | |

(Continued)

FOREIGN PATENT DOCUMENTS

| EP | 1 936 718 A1 | 6/2008 |
|---|---|---|
| JP | 10-321228 | 12/1998 |

(Continued)

OTHER PUBLICATIONS

Wu et al. (High Capacity, Surface-Modified Layered Li[Li(1-x)/3 M(2-x)/3 Cox/3]O2 Cathodes with Low Irreversible Capacity Loss, Electrochemical and Solid State Letters, vol. 9, No. 5, (2006), pp. A221-A224,XP002460582).*

(Continued)

*Primary Examiner* — Patrick Ryan
*Assistant Examiner* — Ben Lewis
(74) *Attorney, Agent, or Firm* — Christie, Parker & Hale, LLP

(57) ABSTRACT

Provided is a cathode active material including a lithium metal oxide of Formula 1 below:

$$Li[Li_xMe_yM_z]O_{2+d} \qquad <\text{Formula 1}>$$

wherein $x+y+z=1$; $0<x<0.33$; $0<z<0.1$; $0\leq d\leq 0.1$; Me is at least one metal selected from the group consisting of Ti, V, Cr, Mn, Fe, Co, Ni, Cu, Al, Mg, Zr, and B; and M is at least one metal selected from the group consisting of Mo, W, Ir, Ni, and Mg.

9 Claims, 4 Drawing Sheets

(56) References Cited

U.S. PATENT DOCUMENTS

| | | | |
|---|---|---|---|
| 2007/0122703 A1 | 5/2007 | Whitfield et al. | |
| 2007/0218359 A1* | 9/2007 | Shimizu et al. | 429/223 |
| 2007/0264573 A1 | 11/2007 | Yamada et al. | |
| 2007/0292763 A1 | 12/2007 | Park et al. | |
| 2008/0145760 A1* | 6/2008 | Yoon et al. | 429/223 |

FOREIGN PATENT DOCUMENTS

| | | |
|---|---|---|
| JP | 2004-006267 | 1/2004 |
| JP | 2005-235628 | 9/2005 |
| JP | 2006-332020 | 12/2006 |
| JP | 2007-095443 | 4/2007 |
| JP | 2007-220630 | 8/2007 |
| JP | 2007-242581 | 9/2007 |
| KR | 10-2004-0092245 | 3/2004 |
| KR | 10-1206037 | 11/2012 |
| WO | WO 02/41419 A1 | 5/2002 |
| WO | WO 2007/037235 A1 | 4/2007 |

OTHER PUBLICATIONS

Wu et al. (High Capacity, Surface-Modified Layered $Li[Li_{(1-x)/3}M_{(2-x)/3}Co_{x/3}]O_2$ Cathodes with Low Irreversible Capacity Loss, Electrochemical and Solid State Letters, vol. 9, No. 5, (2006), pp. A221-A224,XP002460582) (For Feb. 1, 2012).*

Search Report issued in European Patent Application No. 09153701.9 on Jul. 8, 2009.

Park et al., "Synthesis and structural characterization of layered $Li[Ni_{1/3+x}Co_{1/3}Mn_{1/3-2x}Mo_x]O_2$ cathode materials by ultrasonic spray pyrolysis," *Journal of Power Sources*, vol. 146 (2005), pp. 622-625.

JPO Office action dated Aug. 27, 2013, with English translation, for corresponding Japanese Patent application 2009-046471, (9 pages).

* cited by examiner ium metal oxides in the form of Li[Li$_x$M$_{1-x}$]O$_2$ (x>0, M is a plurality of transition metals) provide an increased electrical capacity of 250-280 mAh/g. However, the lithium metal oxides, including excess lithium, have low electrical conductivity, poor cycle properties, and their high rate properties are deteriorated.

SUMMARY OF THE INVENTION

Aspects of the present invention provide a cathode active material including a lithium metal oxide of Formula 1 below:

$$Li[Li_xMe_yM_z]O_{2+d} \qquad <Formula\ 1>$$

wherein x+y+z=1; 0<x<0.33; 0<z<0.1; 0≤d≤0.1; Me is at least one metal selected from the group consisting of Ti, V, Cr, Mn, Fe, Co, Ni, Cu, Al, Mg, Zr, and B; and M is at least one metal selected from the group consisting of Mo, W, Ir, Ni, and Mg.

Aspects of the present invention also provide a cathode and a lithium battery including the cathode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
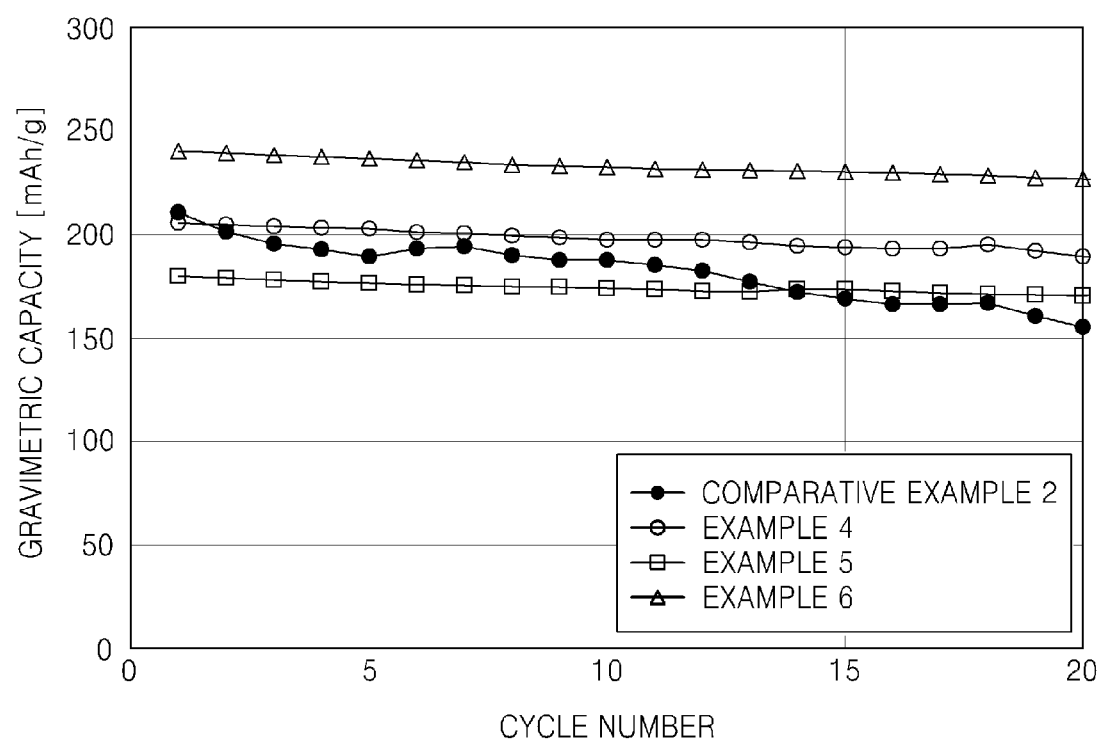
FIG. 1 is test result of charge/discharge for lithium batteries prepared from Examples 4 to 6 according to aspects of the present invention and Comparative Example 2.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In the following, "selected from at least one," or similar language, is intended to mean that the item selected may be only one or one of each of the items listed in the group.

A cathode active material according to an embodiment of the present invention includes a lithium metal oxide of Formula 1 below:

$$Li[Li_xMe_yM_z]O_{2+d} \qquad <Formula\ 1>$$

wherein x+y+z=1; 0<x<0.33; 0<z<0.1; 0≤d≤0.1; Me is at least one metal selected from the group consisting of Ti, V, Cr, Mn, Fe, Co, Ni, Cu, Al, Mg, Zr, and B; and M is at least one metal selected from the group consisting of Mo, W, Ir, Ni, and Mg.

The lithium metal oxide Li[Li$_x$Me$_y$M$_z$]O$_{2+d}$ is obtained by additionally doping a new metal M to a lithium metal oxide including excess lithium and metal Me; and thus, a battery using the lithium metal oxide according to aspects of the present invention has improved cycle properties and high rate properties. The doping content of the new metal M in the lithium metal oxide Li[Li$_x$Me$_y$M$_z$]O$_{2+d}$ may preferably be less than 10 mol % of a total number of moles of the [Li$_x$Me$_y$M$_z$] portion of the Li[Li$_x$Me$_y$M$_z$]O$_{2+d}$. In Formula 1 above, the doping content is given as z, which is in the range of 0<z<0.1. The content range is suitable for improving the cycle properties of the battery. If the z value is outside of the range above, there may be a significant reduction in the battery capacity. Also, the metal Me may preferably include a plurality of metals.

According to another embodiment of the present invention, z may be in the range of $0<z<0.05$.

According to another embodiment of the present invention, the lithium metal oxide may be represented by Formula 2 below:

$$Li[Li_xMe_yMo_z]O_{2+d} \qquad \text{<Formula 2>}$$

wherein $x+y+z=1$; $0<x<0.33$, $0<z<0.1$; $0\leq d\leq 0.1$, and Me is at least one metal selected from the group consisting of Ti, V, Cr, Mn, Fe, Co, Ni, Cu, Al, Mg, Zr, and B. In particular, z may preferably be in the range of $0<z<0.05$.

According to another embodiment of the present invention, the lithium metal oxide may be represented by Formula 3 below:

$$Li[Li_xNi_aCo_bMn_cM_z]O_{2+d} \qquad \text{<Formula 3>}$$

wherein $x+a+b+c+z=1$; $0<x<0.33$, $0<z<0.1$, $0<a<0.2$, $0<b<0.2$, $0<c<0.6$; $0\leq d\leq 0.1$, and M is at least one metal selected from the group consisting of Mo, W, Ir, Ni, and Mg. In particular, z may preferably be in the range of $0<z<0.05$.

According to another embodiment of the present invention, the lithium metal oxide may be represented by Formula 4 below:

$$Li[Li_xNi_aCo_bMn_cMo_z]O_{2+d} \qquad \text{<Formula 4>}$$

wherein $x+a+b+c+z=1$; $0<x<0.33$, $0<z<0.1$, $0<a<0.2$, $0<b<0.2$, $0<c<0.6$; and $0\leq d\leq 0.1$ In particular, z may preferably be in the range of $0<z<0.05$.

In particular, the lithium metal oxide may preferably be $Li[Li_{0.2}Ni_{0.16}Co_{0.08}Mn_{0.54}Mo_{0.02}]O_2$, $Li[Li_{0.2}Ni_{0.16}Co_{0.08}Mn_{0.52}Mo_{0.04}]O_2$, $Li[Li_{0.2}Ni_{0.2}Co_{0.08}Mn_{0.48}Mo_{0.04}]O_2$, or the like.

According to the current embodiment of the present invention, a method of preparing the lithium metal oxide includes: preparing a sol by mixing a metal precursor, diluted nitric acid, an aqueous citric acid solution, and ethylene glycol; forming a gel by heating the sol, and pyrolyzing the gel; and heat treating the pyrolyzed gel.

The metal precursor may be a precursor of lithium composing the lithium metal oxide, and other metal precursors. The form of the metal precursor is not particularly limited, but is generally a metal-containing salt or a complex of metal coordinated with an organic ligand.

The content of individual metal precursors according to the type of the metal composing the metal precursor may be appropriately selected by considering the composition of the lithium metal oxide. The metal precursor may preferably include: a first metal precursor including at least one metal selected from the group consisting of Ti, V, Cr, Mn, Fe, Co, Ni, Cu, Al, Mg, Zr, and B; a second metal precursor including at least one metal selected from the group consisting of Mo, W, Ir, Ni, and Mg; and a lithium metal precursor. For example, the first metal precursor may include nickel acetate, cobalt acetate, and manganese acetate, and the second metal precursor may include ammonium heptamolybdate, and the lithium metal precursor may include lithium carbonate or the like.

The citric acid acts as a chelating agent. The ethylene glycol is gelled to act as a matrix. The concentration of the diluted nitric acid may preferably be 0.01 to 10 wt %.

A mixing ratio of the metal precursor, citric acid, and ethylene glycol may be appropriately selected as required.

The step of forming a gel by heating the sol, and then, pyrolyzing the gel accompanies a phase change which occurs when the sol-containing reaction vessel is continuously heated. That is, if the reaction vessel containing the sol is heated, the sol transforms into a gel, and the residue is pyrolyzed after all the water is evaporated. During the pyrolysis of the sol, the heating may preferably be performed under 300 to 500° C. for 1 to 5 hours, but may be appropriately selected as required. The heat treatment of the pyrolyzed gel may preferably be performed by flowing dry air thereacross at 850 to 1100° C. for 3 to 12 hours, but may be appropriately selected as required. The heat treated lithium metal oxide may preferably be dry-cooled in a furnace.

According to another embodiment of the present invention, a method of preparing the lithium metal oxide includes: preparing a first aqueous solution including a first metal precursor; preparing a second aqueous solution including a lithium metal precursor and acetic acid; preparing a third aqueous solution by adding a second metal precursor and citric acid to the second aqueous solution; obtaining a precipitate by adding an aqueous oxalic acid solution to a mixture solution of the first and third aqueous solutions; removing water from the precipitate and pyrolyzing the precipitate; and heat treating the pyrolyzed precipitate.

The first metal precursor may preferably be a precursor including at least one metal selected from the group consisting of Ti, V, Cr, Mn, Fe, Co, Ni, Cu, Al, Mg, Zr, and B. The second metal precursor may preferably include at least one metal selected from the group consisting of Mo, W, Ir, Ni, and Mg.

For example, the first metal precursor may include nickel acetate, cobalt acetate, and manganese acetate, and the second metal precursor may include ammonium heptamolybdate, and the lithium metal precursor may include lithium carbonate or the like.

The acetic acid acts to uniformly dissolve the metal precursors. The oxalic acid acts as a precipitating agent, and the citric acid acts as a chelating agent.

The mixing ratio of the metal precursors and acetic acid or citiric acid within each aqueous solution may be appropriately selected as necessary. The concentration of the oxalic acid solution may also be appropriately selected as necessary. Moreover, the mixing ratio of the three types of solutions may also be appropriately selected as necessary.

The process of pyrolyzing the precipitate may preferably be performed at 300 to 500° C. for 1 to 5 hours, but may be appropriately selected as necessary. The heat treatment of the pyrolyzed gel may preferably be performed at 850 to 1100° C. for 3 to 12 hours, but may be appropriately selected as necessary. The heat-treated lithium metal oxide may preferably be dried in a furnace.

The cathode according to another embodiment of the present invention includes the cathode active material. The cathode may be, for example, prepared by molding a cathode mixture material, including the cathode active material and a binder, into a predetermined form, or by applying the cathode mixture material on a current collector, such as copper foil or aluminum foil.

In particular, a cathode mixture material, which is a mixture of a cathode active material, a conducting material, a binder, and a solvent, is prepared. The cathode may be obtained by either directly coating the cathode mixture material on the aluminum foil current collector, or by casting the cathode mixture material on a separate support, and then laminating the cathode active material film separated from the support on the aluminum foil current collector. However, the cathode is not limited to the above, but may also be in other forms.

The conducting material may be carbon black, graphite microparticles, and the like, and the binder may be vinylidene fluoride/hexafluoropropylene copolymer, polyvinylidene fluoride (PVDF), polyacrylonitrile (PAN), polymethylmethacrylate, polytetrafluoroethylene and mixtures thereof, or styrene butadiene rubber-based polymer, and the solvent may be N-methylpyrrolidone, acetone, or water. The contents of the cathode active material, the conducting material, the binder, and the solvent may be selected as necessary.

The lithium battery according to another embodiment of the present invention uses the cathode including the cathode active material, and may be prepared by the following method.

First, the cathode is prepared according to the method of cathode preparation. Next, an anode mixture material is prepared by mixing an anode active material, a conducting material, a binder, and a solvent. An anode plate is obtained by either coating an anode mixture material directly on a copper current collector, or by casting the anode mixture material on a separate support, and then laminating the anode active material film, separated from the support, on the copper current collector. Here, the contents of the anode active material, conducting material, binder and solvent may be selected as necessary.

The anode active material may be a lithium metal, lithium alloy, carbon material, graphite, or the like. The conducting material, binder, and the solvent in the anode mixture material may be the same as those used in the cathode. If necessary, a plasticizer may further be added to the cathode mixture material and/or the anode mixture material to form pores within the electrode plates.

The cathode and the anode may be separated from each other by a separator that may be selected as necessary. In particular, a separator which has low resistance to ion transportation of the electrode and high electrolyte hydration abilities is preferable. For example, glass fiber, polyester, Teflon®, polyethylene, polypropylene, polytetrafluoroethylene (PTFE), or a combination selected therefrom may be used, and may either be woven or non-woven. More particularly, separators that are flexible, such as polyethylene and polypropylene, may be used for lithium ion batteries, and separators with high organic electrolyte solution impregnating abilities may be used for lithium ion polymer batteries that may be prepared using the following method.

A separator composition is prepared by mixing a polymer resin, a filler, and a solvent, and the separator composition may be coated directly on the electrode and dried to form a separator film. Alternately, the separator composition may be cast on a support and dried, and then the separator film separated from the support may be laminated on the electrode.

The polymer resin is not particularly limited, and any material used for binding materials of the electrode may be used. For example, vinylidenefluoride/hexafluoropropylene copolymer, polyvinylidene fluoride (PVDF), polyacrylonitrile, polymethylmethacrylate, or mixtures thereof may be used.

The electrolyte solution may be a solvent of propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethoxyethane, sulforane, dichloroethane, chlorobenzene, nitrobenzene, diethylene glycol, dimethyl ether, or mixtures thereof, with a lithium salt such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers) LiCl, LiI, or mixtures thereof dissolved in the solvent. A separator may be disposed between the cathode plate and the anode plate to form a battery structure. If such a battery structure is coiled or folded into a cylindrical battery case or a rectangular battery case, and the organic electrolyte solution is injected thereto, a lithium ion battery is completed. If such a battery structure is stacked in a bi-cell structure, impregnated with the organic electrolyte solution, and packaged and sealed in a pouch, a lithium ion polymer battery is completed.

Aspects of the present invention will now be described in more detail with reference to the following examples. However, these examples are for illustrative purposes only and are not intended to limit the scope of the invention.

Preparation of Cathode Active Material

Example 1

Preparation of $Li[Li_{0.2}Ni_{0.16}Co_{0.08}Mn_{0.54}Mo_{0.02}]O_2$

As starting materials, lithium carbonate, nickel acetate, cobalt acetate, manganese acetate, and ammonium heptamolybdate were selected. In order to produce 0.04 mol of $Li[Li_{0.2}Ni_{0.16}Co_{0.08}Mn_{0.54}Mo_{0.02}]O_2$, the starting materials were prepared by calculating the molar ratios between Li, Ni, Co, Mn, and Mo accordingly.

The starting materials were dissolved in 50 ml of diluted nitric acid solution where 5 g of nitric acid (60 wt %) and 50 ml of deionized water are mixed, and 50 ml of citric acid solution (2M) and 30 ml of ethylene glycol were added to the solution to produce a sol.

The sol was heated to evaporate water therefrom to form a gel, and the gel was continuously heated to pyrolyze. Then, the pyrolyzed gel was placed in a furnace through which dry air flowed and heat treated at 1000° C. for 5 hours to prepare a cathode active material, which was then left in the furnace to be cooled.

Example 2

Preparation of $Li[Li_{0.2}Ni_{0.16}Co_{0.08}Mn_{0.52}Mo_{0.04}]O_2$ 0.04 mol of $Li[Li_{0.2}Ni_{0.16}Co_{0.08}Mn_{0.52}Mo_{0.04}]O_2$ was produced using the same method as in Example 1 above, except that the starting materials were prepared with modified molar ratios between Li, Ni, Co, Mn, and Mo accordingly.

Example 3

Preparation of $Li[Li_{0.02}Ni_{0.2}Co_{0.08}Mn_{0.48}Mo_{0.04}]O_2$

As starting materials, lithium carbonate, nickel acetate, cobalt acetate, manganese acetate, and ammonium heptamolybdate were selected. In order to produce 0.04 mol of $Li[Li_{0.2}Ni_{0.2}Co_{0.08}Mn_{0.48}Mo_{0.04}]O_2$, the starting materials were prepared by calculating the molar ratios between Li, Ni, Co, Mn, and Mo accordingly.

An aqueous solution was prepared by adding 3.5 ml of acetic acid and 1.8266 g of lithium carbonate to 100 ml of distilled water. 0.2825 g of ammonium heptamolybdate and 4 g of citric acid were added to the aqueous solution and stirred to produce an aqueous Li/Mo solution. An aqueous Ni/Co/Mn solution was prepared by adding 1.9909 g of nickel acetate, 0.7971 g of cobalt acetate, and 4.7057 g of manganese acetate to 100 ml of deionized water. 7.5642 g of oxalic acid was added to 100 ml of deionized water to produce an oxalic acid solution.

The oxalic acid solution was added to a mixture of the aqueous Ni/Co/Mn solution and the aqueous Li/Mo solution, and the metal ions were precipitated in the forms of metal oxalate salts.

The precipitate-containing solution was heated at 100° C. to dry the moisture, and the dried precipitate was additionally heated at 500° C. for 3 hours to pyrolyze. The pyrolyzed precipitate was placed in a furnace through which dry air flowed, and heat treated at 1000° C. for 5 hours to produce a cathode active material, which was then left in the furnace to be cooled.

Comparative Example 1

Preparation of $Li[Li_{0.2}Ni_{0.16}Co_{0.08}Mn_{0.56}]O_2$

As starting materials, lithium carbonate, nickel acetate, cobalt acetate, and manganese acetate were selected. 0.04 mol of $Li[Li_{0.2}Ni_{0.16}Co_{0.08}Mn_{0.56}]O_2$ was produced using the same method as in Example 1, except that the starting materials were prepared by calculating the molar ratios between Li, Ni, Co, and Mn accordingly.

Preparation of Cathode and Lithium Battery

Example 4

The cathode active material powder synthesized in Example 1 and a carbon conducting material (Ketjen Black; EC-600JD) were mixed uniformly in a weight ratio of 93:3, and a polyvinylidene fluoride (PVDF) binder solution was added to produce a slurry with a weight ratio of active material: carbon conducting material: binder to be 93:3:4.

The active material slurry was coated on an aluminum foil of 15 μm in thickness, and dried to produce a cathode plate, and was additionally vacuum dried to fabricate a coin cell (CR2016 type) of 12 mm in diameter.

When preparing the coin cell, metal lithium was used as a counter electrode, and 1.3M $LiPF_6$ dissolved in a mixture solvent of ethylene carbonate(EC):diethyl carbonate(DEC) (3:7 volume ratio) was used as an electrolyte.

Example 5

A lithium battery was produced using the same method as in Example 4, except that the cathode active material synthesized in Example 2 was used.

Example 6

A lithium battery was produced using the same method as in Example 4, except that the cathode active material synthesized in Example 3 was used.

Comparative Example 2

A lithium battery was produced using the same method as in Example 4, except that the cathode active material synthesized in Comparative Example 1 was used.

Evaluation Example 1

Charge/Discharge Test

The coin cells prepared in Examples 4 to 6 and Comparative Example 2 were charged at a constant current of 125 mA/g until a voltage of 4.6V versus Li was reached. After reaching the voltage of 4.6V, the coin cells were charged at a constant voltage until the constant current value reached to 1/10 of the 125 mA/g. After charging, the coin cells were discharged at a constant current of 50 mA/g each until a voltage of 2V versus Li was reached, and the discharge capacity was measured. The measured results are shown in Table 1 below.

The coin cells prepared in Examples 4 to 6 and Comparative Example 2 were charged at a constant current of 125 mA/g until a voltage of 4.6V versus Li was reached. After reaching the voltage of 4.6V, the coin cells were charged at a constant voltage until the constant current value reached 1/10 of the 125 mA/g. After charging, the coin cells were discharged at constant currents of 250 mA/g (1 C rate) and 25 mA/g (0.1 C rate) each until a voltage of 2V versus Li was reached to evaluate the high rate discharge properties. The measured results are shown in Table 1 below, and the high rate discharge properties are represented by a capacitance ratio of Equation 1.

Capacity ratio [%]=[discharge capacity at 1 C rate/ discharge capacity at 0.1 C rate]×100    <Equation 1>

The coin cells prepared in Examples 4 to 6 and Comparative Example 2 were charged at a constant current of 125 mA/g until a voltage of 4.6V versus Li was reached. After reaching the voltage of 4.6V, the coin cells were charged at a constant voltage until the constant current value reached 1/10 of the 125 mA/g. After charging, the coin cells were discharged at a constant current of 125 mA/g until a voltage of 2V versus Li was reached. The charge/discharge cycle was repeated 20 times and the results are shown in FIG. 1 and Table 1. The capacity retention ratio in Table 1 is represented by Equation 2 below.

Capacity Retention Ratio [%]=[discharge capacity at $20^{th}$ cycle/discharge capacity at $1^{st}$ cycle]×100    <Equation 2>

Figure 2A:
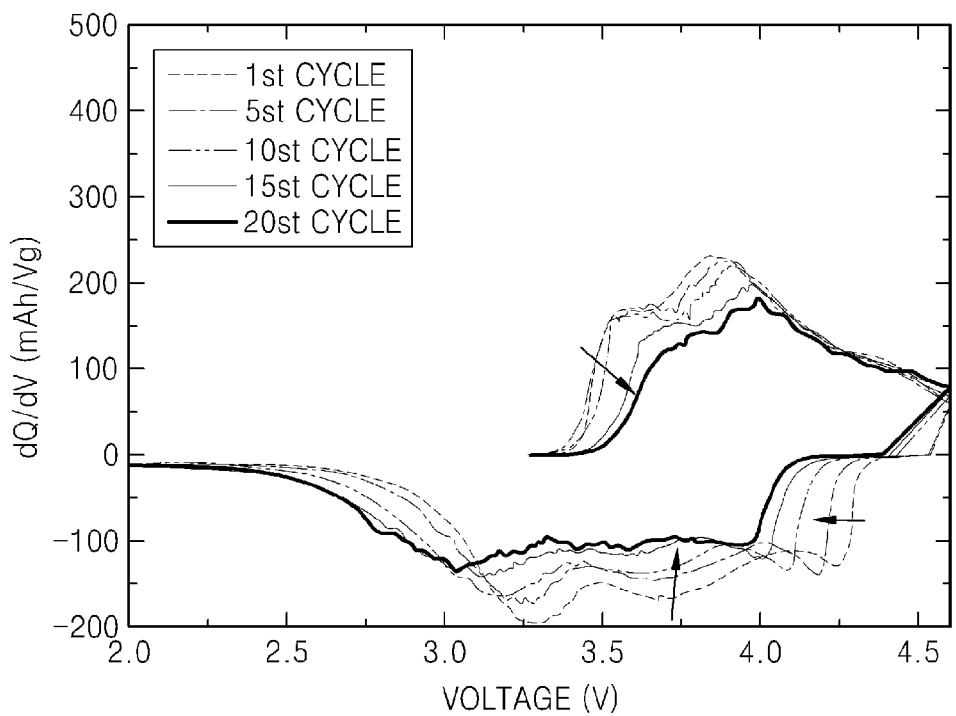
FIG. 2A is a graph illustrating charge/discharge curves of lithium batteries prepared from Comparative Example 2 at $1^{st}$, $5^{th}$, $10^{th}$, $15^{th}$, and $20^{th}$ cycles, shown as a derivative of electrical capacity (dQ/dV) with respect to voltage (V)
Figure 2B:
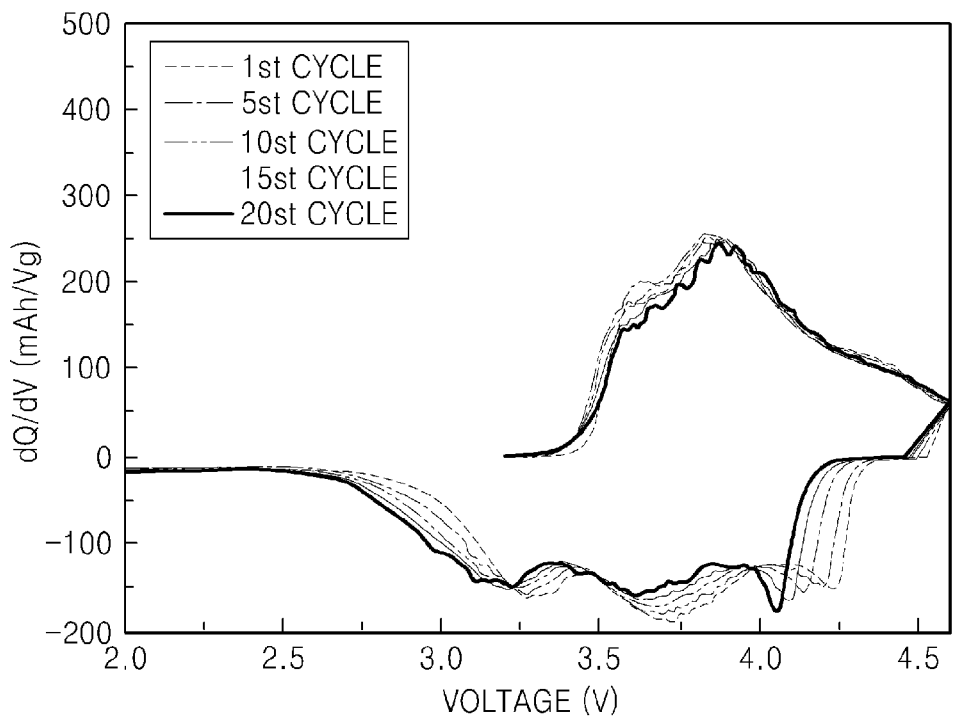
FIG. 2B is a graph illustrating charge/discharge curves of lithium batteries prepared from Example 4 according to aspects of the present invention at $1^{st}$, $5^{th}$, $10^{th}$, $15^{th}$, and $20^{th}$ cycles, shown as a derivative of electrical capacity (dQ/dV) with respect to voltage (V)

Moreover, graphs of dQ/dV with respect to voltage (V) at $1^{st}$, $5^{th}$, $10^{th}$, $15^{th}$, and $20^{th}$ cycles of the coin cells prepared in Examples 4 and Comparative Example 2 are shown in FIGS. 2A and 2B respectively.

TABLE 1

|  | Discharge Capacity [mAh/g] | Capacity Ratio [%] | Capacity Retention Ratio [%] |
| --- | --- | --- | --- |
| Example 4 | 246 | 81 | 92 |
| Example 5 | 216 | 79 | 94 |
| Example 6 | 268 | 87 | 94 |
| Comparative Example 2 | 261 | 77 | 73 |

As shown in FIG. 1 and Table 1, Examples 4 to 6, in which cathode active materials according to aspects of the present invention are used, demonstrated better cycle properties (capacity retention ratio) than Comparative Example 2.

As shown in FIG. 2A, Comparative Example 2 showed a reduction of derivative values by an increased overpotential as the cycles increase, but in FIG. 2B of Example 4, the increase in the overpotential was suppressed, and thus a change in the derivative values was reduced.

In addition, Examples 4 to 6 showed improved high rate discharge properties (capacity ratio) as compared to Comparative Example 2.

Evaluation Example 2

XRD Measurements before and after Charge/Discharge

Two sets of 7 coin cells were produced. A first set of 7 coin cells was prepared according to Example 6 and a second set of 7 coin cells was prepared according to Comparative Example 2. First, one of the first set of coin cells, produced according to Example 6 and not yet charge/discharged, was taken apart and the X-ray diffraction (XRD) for the cathode active material was analyzed. Next, the remaining 6 coin cells of the first set produced according to Example 6 were charge/discharged as follows. The 6 coin cells were charged at a constant current of 125 mAh/g until a voltage of 4.6V versus Li metal was reached. After reaching the voltage of 4.6V, the 6 coin cells were charged at a constant voltage until the constant current value reached 1/10 of the 125 mA/g. After charging, the 6 coin cells were discharged at a constant current of 125 mA/g until a voltage of 2V versus Li was reached. The charge/discharge was performed 50 times. Then, 4 of the coin cells of the first set were charged until 4V, 4.1V 4.47V, and 4.6V respectively, and were taken apart to measure the XRD, and the remaining 2 coin cells were charged until 4.6V, and were discharged until 3.7V and 2.5V respectively, and were taken apart to measure the XRD. The results are shown in FIG. 3A.

Figure 3A:
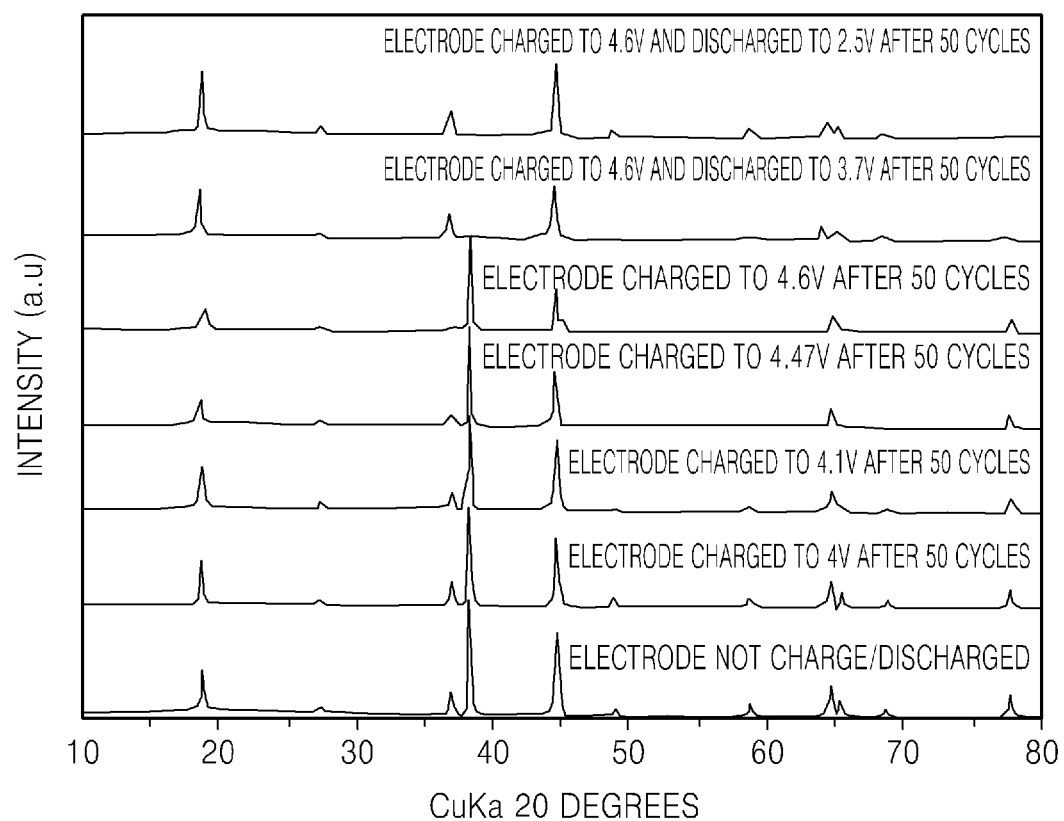
FIG. 3A is an XRD analysis result of Example 6 according to aspects of the present invention to illustrate XRD of an initial electrode and XRD after 50 cycles at respective charge/discharge voltages.
Figure 3B:
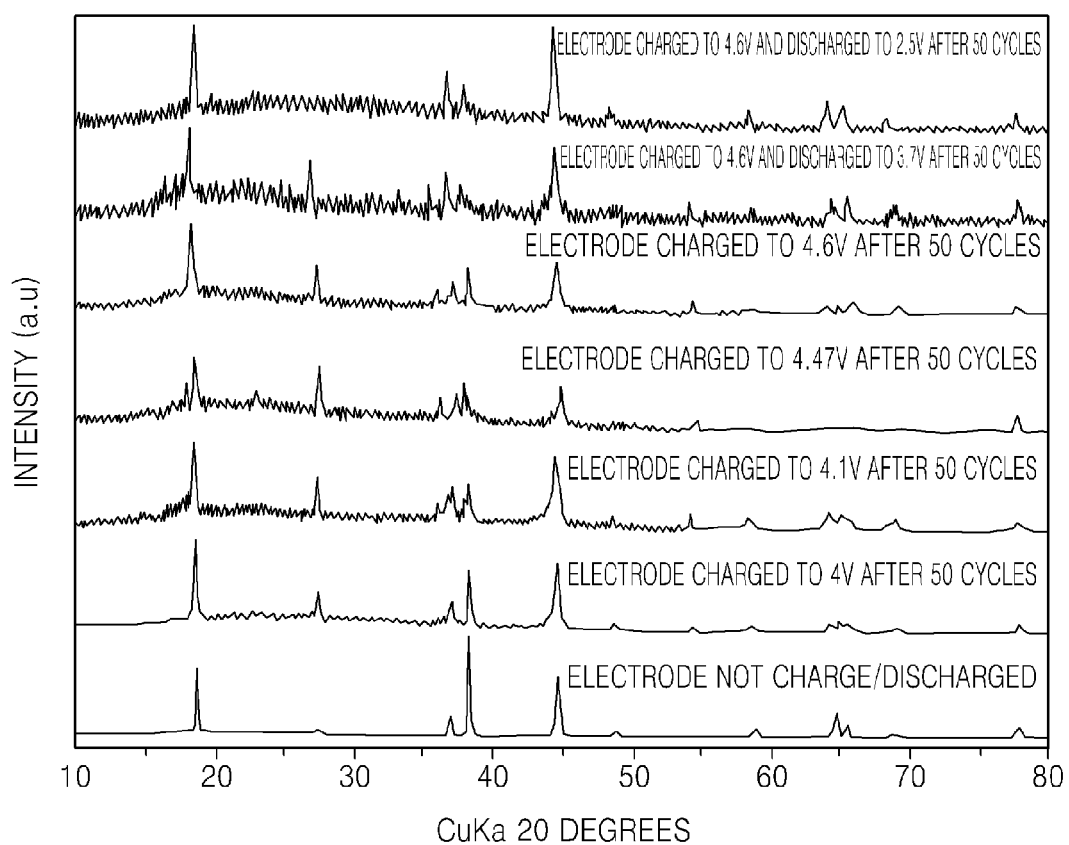
FIG. 3B is an XRD analysis result of Comparative Example 2 to illustrate XRD of an initial electrode and XRD after 50 cycles at respective charge/discharge voltages.

The 7 coin cells of the second set, produced according to Comparative Example 2, were also analyzed in terms of their XRD of cathode active material by using the same method as above, and the results are shown in FIG. 3B.

FIG. 3A is an XRD analysis result of Example 6 to illustrate XRD of an initial electrode and XRD after 50 cycles at respective charge/discharge voltages, and FIG. 3B is an XRD analysis result of Comparative Example 2 to illustrate XRD of an initial electrode and XRD after 50 cycles at respective charge/discharge voltages. It can be seen that, after 50 cycles, the cathode active material of Example 6 maintains a better crystalline state than that of Comparative Example 2. This is a result of improved cycle properties of the initial electrode produced according to Example 6 as compared to Comparative Example 2.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode active material comprising a lithium metal oxide of Formula 3 below:

$$Li[Li_xNi_aCo_bMn_cM_z]O_{2+d} \qquad <\text{Formula 3}>$$

wherein $x+a+b+c+z=1$; $0.1667 \leq x < 0.33$; $0 < z < 0.1$; $0 < a \leq 0.2$; $0 < b < 0.2$; $0 < c < 0.6$; $0 \leq d \leq 0.1$; and M is at least one metal selected from the group consisting of Mo, W, and Ir.

2. The cathode active material of claim 1, wherein z is in the range of $0 < z < 0.05$.

3. The cathode active material of claim 1, wherein the lithium metal oxide is represented by Formula 4 below:

$$Li[Li_xNi_aCo_bMn_cMo_z]O_{2+d} \qquad <\text{Formula 4}>$$

wherein $x+a+b+c+z=1$; $0.1667 \leq x < 0.33$; $0 < z < 0.1$, $0 < a \leq 0.2$, $0 < b < 0.2$, $0 < c < 0.6$; and $0 \leq d \leq 0.1$.

4. The cathode active material of claim 3, wherein z is in the range of $0 < z < 0.05$.

5. The cathode active material of claim 1, wherein the lithium metal oxide of Formula 3 is $Li[Li_{0.2}Ni_{0.16}Co_{0.08}Mn_{0.54}Mo_{0.02}]O_2$.

6. The cathode active material of claim 1, wherein the lithium metal oxide of Formula 3 is $Li[Li_{0.2}Ni_{0.16}Co_{0.08}Mn_{0.52}Mo_{0.04}]O_2$.

7. The cathode active material of claim 1, wherein the lithium metal oxide of Formula 3 is $Li[Li_{0.2}Ni_{0.2}Co_{0.08}Mn_{0.48}Mo_{0.04}]O_2$.

8. A cathode, comprising:
a cathode active material comprising a lithium metal oxide of Formula 3 below:

$$Li[Li_xNi_aCo_bMn_cM_z]O_{2+d} \qquad <\text{Formula 3}>$$

wherein $x+a+b+c+z=1$; $0.1667 \leq x < 0.33$; $0 < z < 0.1$; $0 < a \leq 0.2$; $0 < b < 0.2$; $0 < c < 0.6$; $0 \leq d \leq 0.1$; and M is at least one metal selected from the group consisting of Mo, W, and Ir.

9. A lithium battery, comprising:
an anode;
a cathode comprising a lithium metal oxide of Formula 3 below:

$$Li[Li_xNi_aCo_bMn_cM_z]O_{2+d} \qquad <\text{Formula 3}>$$

wherein $x+a+b+c+z=1$; $0.1667 \leq x < 0.33$; $0 < z < 0.1$; $0 < a \leq 0.2$; $0 < b < 0.2$; $0 < c < 0.6$; $0 \leq d \leq 0.1$; and M is at least one metal selected from the group consisting of Mo, W, and Ir; and a separator disposed between the anode and the cathode.

* * * * *